March 1, 1938.  H. A. BOYLE  2,109,522
SELF RETAINING GASKET
Filed July 8, 1935
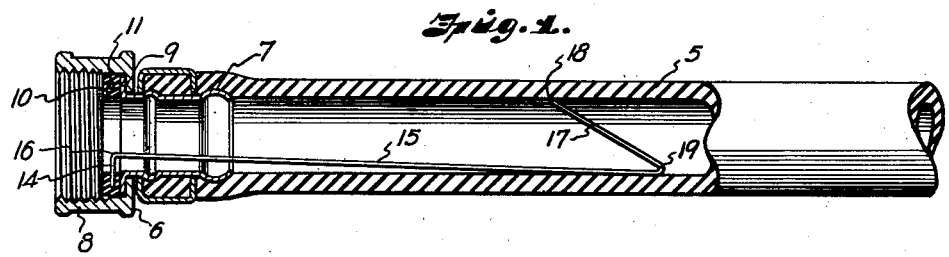
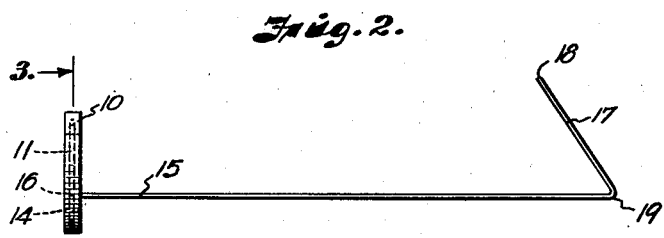
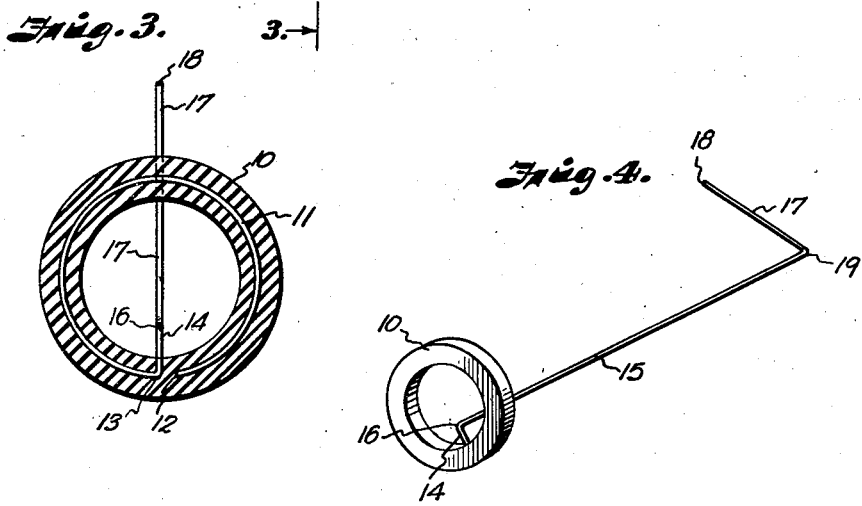
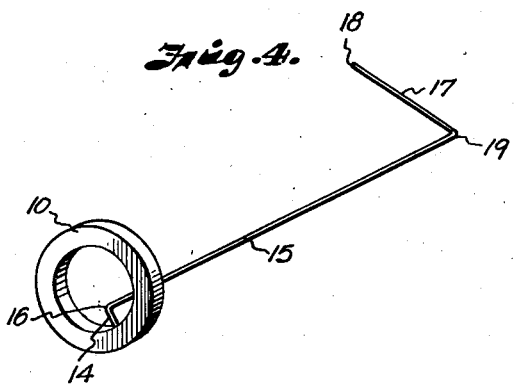
INVENTOR
Harold A. Boyle
BY Alfred R Fuchs
ATTORNEY Patented Mar. 1, 1938

2,109,522

UNITED STATES PATENT OFFICE 2,109,522

SELF RETAINING GASKET

Harold A. Boyle, Overland Park, Kans.

Application July 8, 1935, Serial No. 30,303

2 Claims. (Cl. 285—120)

My invention relates to gaskets, and more particularly to self retaining gaskets for hose couplings, and similar devices.

It is a purpose of my invention to provide a gasket, or washer, for a hose coupling, which will not become accidentally dislodged from the coupling and which can be inserted in any standard hose coupling or any special hose coupling for which it may be made if desired, and retained in position therein so that the same cannot become accidentally dislodged and lost.

It is a particular purpose of my invention to provide a gasket, or washer, of the above mentioned character with retaining means which will cooperate with any hose and any hose coupling, no matter what the length of the sleeve-like portion of the coupling may be and which will in no manner injure or damage the hose.

It is another purpose of my invention to provide a gasket with retaining means of the above mentioned character, which is extremely simple in construction and can be manufactured very cheaply, and which will have frictional engagement with the interior wall of the hose, or similar member, with which the coupling may be associated that has the gasket provided therein.

More particularly my invention comprises retaining means for a washer, or gasket, for a coupling, which is provided with an elongated flexible member extending therefrom into the hose, and which is provided with means thereon which will wedge or jam in the hose so as to frictionally engage with the hose and prevent accidental dislodgement of the washer or gasket. The apparatus is so constructed that it has a tendency to collapse due to its construction and the flexibility of the same so that it can be inserted within the hose by anyone with ease and without any possibility of injuring the gasket in inserting the same, or of injuring the hose, but which will grip the hose tight enough that it will prevent dislodgement of the gasket from the coupling by any of the usual operations in handling a hose while it is disconnected, even though the end thereof may be whipped or jerked around in pulling the hose around from place to place, but which retaining means is so made that if it is desired to remove the gasket a steady pull will remove the gasket from the coupling and the retaining means from the hose without any damage to the gasket or to the hose.

More particularly my improved hose gasket, or washer, preferably, comprises a ring-like member similar to the gaskets, or washers, at present in use, which has a loop of wire molded therein in such a manner that substantially a complete circle is formed thereby and which has a portion thereof extending substantially parallel to the axis of the washer in the form of a single elongated finger, which is flexible and which has an obliquely extending end portion thereon, which is also made of the same flexible wire as the other parts of the retaining member and which is of such length that the same will position itself crosswise of the passage in the hose when an attempt is made to move the gasket outwardly out of its position in the coupling. By using a single finger of flexible material a gasket retaining means is provided which is usable with any type of hose or any type of coupling, and which is extremely simple and cheap in construction and yet will function more perfectly than more complicated devices utilizing more than one finger, or rod-like member, for retaining the gasket in place. Furthermore by my improved construction a mounting of the retaining member relative to the gasket is obtained which will prevent damage to the gasket, as the substantially ring-like loop, forming substantially a complete circle, molded in the gasket will distribute the forces exerted thereon over substantially the entire area of the gasket.

Other objects and advantages of my invention will appear as the description of the drawing proceeds. I desire to have it understood, however, that I do not intend to limit myself to the particular details shown or described, except as defined in the claims.

In the drawing:

Fig. 1 is a view partly in longitudinal section and partly in elevation of a portion of a hose having a coupling associated therewith, with which my improved gasket and retaining means therefor are associated.

Fig. 2 is a view of my improved gasket and retaining means therefor in side elevation detached.

Fig. 3 is a section thereof taken on the line 3—3 of Fig. 2, on an enlarged scale, and Fig. 4 is a perspective view of my improved gasket, or washer, and its retaining means.

Referring in detail to the drawing, my improved gasket, or washer, and retaining means therefor are shown as being applied to a hose 5 which may be of any well known construction and which has a coupling 6 attached thereto in any desired manner, as by means of the sleeve-like member 7 extending into the hose and any suitable means for clamping the hose to said sleeve-like member. The coupling is provided with the usual internally threaded member 8, which is adapted to engage with an externally threaded coupling member in the usual manner, the member 8 being swiveled on the member 7 so as to rotate thereon in the usual manner, the member 7 being shown as being flanged at 9 to provide for such swiveling of the member 8.

My improved gasket 10 is mounted in the coupling 8 in the usual manner, being made of rubber or similar compressible material, and being of a ring-like form, as is commonly the case with washers and gaskets of this character. Provided within the ring-like body portion of the washer, or gasket, 10 is a loop of flexible wire 11, which is molded therein substantially centrally of the cross section of the resilient rubber ring 10, and which is substantially circular in form, making also a complete circle, the end 12 thereof lying adjacent the bend 13 in the wire, which is provided so that the flexible wire member will have an arm 14 extending inwardly toward the center of the ring-like gasket member 10 so as to space the elongated portion 15 of my retaining means, which is in the form of a long flexible finger, from the coupling so as to be free thereof so as to not interfere in any manner with the operation of the coupling or with the providing of a liquid-tight joint between the coupling member 8 and the cooperating coupling member associated therewith in ordinary practice.

It will be noted that there is absolutely no metal whatsoever exposed on any of the faces of the gasket, or washer, that serve to provide a liquid-tight joint between the coupling and the cooperating coupling member, or between the coupling and the hose portion to which the same is attached. The elongated finger, or leg, portion 15 is connected with an inwardly extending arm 14 by a substantially right angular bend 16, as will be clear from Figs. 1, 2, and 4. The wire of which the loop 11 and the finger, or leg portion, 15 is made is, preferably, of considerable flexibility so that the loop within the gasket will not have any effect on the resiliency of the gasket or its ability to flex as may be necessary in use. Also, as will be obvious, as the loop 11 is quite flexible it will have no material effect on the wearing qualities of the gasket member 10, as it will not tend to tear loose from the member after it has been molded therein. The finger 15 terminates in a retaining portion 17, which is formed by means of an obliquely extending end portion on the member 15 which extends at an acute angle to the portion 15 and is of a length sufficient that it is considerably more than the internal diameter of the hose 5 so that it will tend to position itself crosswise in the passage in the hose if moved in a direction from right to left in Figs. 1 and 2.

As the wire of which the device is made is quite flexible, the portion 17 will readily bend itself toward the portion 15 as the gasket is being put in position in the coupling and will offer no material resistance to pushing the gasket 10 into position, and thus will make it easy to assemble the gasket in its proper position in the coupling, and also prevent any harm to the gasket due to any tendency of the wire to push through the same.

After the gasket and its retaining means have been put in position in the hose and hose coupling, respectively, the gasket, or washer will be effectively prevented from disengagement from the coupling. Any jerk or pull or whipping action exerted on the washer 10 due to throwing the hose about, or due to a tendency of the gasket 10 to stick to the coupling member that has been screwed into the member 8, will be prevented from dislodging the gasket 10, as any tendency to pull the gasket outwardly relative to the coupling will cause the member 17 to be bent relative to the member 15 so as to assume a more obtuse angle relative to the member 15 than the position that it would ordinarily have in the hose. Furthermore due to the fact that the length of the portion 17 of the retaining means is such that its extremity 18 is normally further from the finger 15 than the diameter of the passage in the hose 5, the finger 15 and the portion 17 will have a more acute angle to each other than the normal angle of the members 15 and 17 to each other when the device is in the hose and there will be a resilient gripping action of the member 17 on the hose, which, although slight, will be sufficient to cause sufficient frictional contact therewith that the tendency of the member 17 to assume a more obtuse angle upon pull on the gasket 10 toward the left in Fig. 1 will occur because of the frictional grip of the member 17 at the end 18 thereof on the interior wall of the hose. This will cause the bend at 19 to be forced around in an arc toward the wall of the hose and cause said bend or toe portion to engage the hose on the side thereof opposite the end 18 very tightly, wedging the retaining member tightly in the passage in the hose due to the tendency of the member 17 to position itself crosswise in said passage. There will be a certain amount of flexing of the portion 15 also, and bowing of itself slightly so as to curve downwardly, as viewed in Figs. 1 and 2, toward the end thereof where the bend 19 is provided.

Sufficient gripping action of the retaining member will thus be obtained to prevent any accidental dislodgement of the gasket 10. However, if it is desired to remove the gasket 10 from a hose coupling for any reason, all that is necessary is to exert a steady pull on the same in a direction toward the left in Fig. 1, and while there will be some frictional drag between the retaining member and the wall of the passage through the hose, and also of the retaining member on the inner face of the coupling, the material of the retaining member comprising the portions 15 and 17 is such that the gasket can be readily withdrawn without pulling the wire loop 11 out of the gasket.

Thus my improved gasket and retaining means therefor has advantages over such retaining members as have been previously known, which had to be used with special types of couplings, or special types of gaskets, or which interfered with the providing of a tight joint by means of the gasket, or were otherwise so made as to damage the gasket if an attempt were made to remove the gasket from the coupling. Furthermore such previously known retaining members were usually provided with prongs or holding means that had to be of a fixed length to cooperate with a coupling, or with a portion of a coupling, to function and in view of the fact that couplings are made of various styles and of various lengths such devices were not of universal use, and in fact would not properly cooperate with any coupling unless accurately made to measure to fit thereon. My retaining means, on the other hand, will cooperate with any coupling and with various sizes of hose, such as are commonly used for domestic purposes, and can be made to be utilized with any size hose and any size gasket for any kind of a joint that it may be desired to provide a gasket therefor, as the same will cooperate with any tubular opening, whether it be a rubber hose or other tubular member, and does not have to cooperate with any particular type of passage or any particular type of coupling to operate. Furthermore all unnecessary parts have been eliminated and the device can be made at minimum cost.

The retaining member does not have to grip the interior of the hose very tightly because the elongated finger portion 15 is of such length that the gripping portion on the end thereof is spaced at such a distance from the gasket that the leverage exerted by any movement of the gasket on this retaining portion will not be very great. This is due not only to the length of the portion 15, but due to the flexibility of the material thereof, the finger 15 tending to bend when any force is exerted thereon, thus acting more like a cord than like a rod or stiff wire would act when a pull is exerted on the gasket in an outward direction.

What I claim is:—

1. Gasket retaining means comprising a single flexible member extending from said gasket and obliquely extending flexible means on the end of said member remote from said gasket and of a length sufficient to wedge itself across a passage through a member to which said gasket is applied.

2. The combination with a hose and a hose coupling of a gasket for said coupling and means for retaining said gasket in position in said coupling comprising a portion mounted in said gasket and a single elongated flexible arm extending therefrom into said hose having a straight angular end portion thereon longer than the diameter of the passage through said hose extending obliquely thereto.

HAROLD A. BOYLE.